United States Patent [19]

Pindar et al.

[11] 4,454,059

[45] Jun. 12, 1984

[54] NITROGENOUS DISPERSANTS, LUBRICANTS AND CONCENTRATES CONTAINING SAID NITROGENOUS DISPERSANTS

[75] Inventors: John F. Pindar, Euclid; Jerome M. Cohen, University Hts.; Charles P. Bryant, Euclid, all of Ohio

[73] Assignee: The Lubrizol Corporation, Wickliffe, Ohio

[21] Appl. No.: 254,611

[22] Filed: Apr. 16, 1981

Related U.S. Application Data

[63] Continuation of Ser. No. 741,184, Nov. 12, 1976, abandoned, which is a continuation-in-part of Ser. No. 701,712, Jul. 1, 1976, abandoned, which is a continuation-in-part of Ser. No. 540,470, Jan. 13, 1975, Pat. No. 3,980,569, which is a continuation-in-part of Ser. No. 613,664, Sep. 16, 1975, Pat. No. 4,053,428, which is a continuation-in-part of Ser. No. 540,570, Jan. 13, 1975, Pat. No. 3,980,569, which is a continuation-in-part of Ser. No. 451,644, Mar. 15, 1974, abandoned.

[51] Int. Cl.$^3$ .............................................. C10M 1/32
[52] U.S. Cl. .............................. 252/51.5 R; 564/367; 564/368; 564/369; 564/370; 564/389; 564/390
[58] Field of Search ....................... 44/75; 252/51.5 R

[56] References Cited

U.S. PATENT DOCUMENTS

| | | |
|---|---|---|
| 2,163,637 | 6/1939 | Thomas . |
| 2,340,036 | 1/1944 | Zimmer et al. ............ 252/51.5 R X |
| 2,453,850 | 11/1948 | Mikeska et al. ................ 252/51.5 R |
| 2,459,112 | 1/1949 | Oberright ....................... 252/51.5 R |
| 2,585,196 | 2/1952 | Walton . |
| 2,707,715 | 3/1955 | Martin . |
| 2,796,423 | 6/1957 | Cottle et al. . |
| 2,859,186 | 11/1958 | Boresch et al. . |
| 2,870,134 | 1/1959 | Kluge et al. . |
| 2,912,395 | 11/1959 | Graham . |
| 2,962,442 | 11/1960 | Andress, Jr. .................. 252/51.5 R |
| 3,093,688 | 6/1963 | Kordzinski et al. . |
| 3,127,251 | 3/1964 | Groote et al. . |
| 3,166,516 | 1/1965 | Kirkpatrick et al. . |
| 3,211,804 | 10/1965 | Baum et al. . |
| 3,306,938 | 2/1967 | Welch et al. . |
| 3,336,226 | 8/1967 | Kantsky et al. . |
| 3,368,972 | 2/1968 | Otto . |
| 3,413,347 | 11/1968 | Worrel . |
| 3,416,903 | 12/1968 | Eckert et al. . |
| 3,448,047 | 6/1969 | Traise et al. . |
| 3,501,527 | 3/1970 | Little et al. . |
| 3,539,633 | 11/1970 | Piasek et al. . |
| 3,539,646 | 11/1970 | Dannels et al. . |
| 3,637,430 | 1/1972 | Dahms et al. . |
| 3,649,229 | 3/1972 | Otto . |
| 3,703,494 | 11/1972 | Anderson et al. . |
| 3,725,277 | 4/1973 | Worrel . |
| 3,736,357 | 4/1969 | Piasek et al. . |
| 3,737,465 | 6/1973 | Karll et al. . |
| 3,798,165 | 3/1974 | Piasek et al. . |
| 3,944,397 | 3/1976 | Gardiner et al. . |
| 3,948,619 | 4/1976 | Worrel . |
| 3,980,569 | 9/1976 | Pindar et al. .................. 252/51.5 R |
| 3,981,929 | 9/1976 | Davis et al. . |
| 3,985,802 | 10/1976 | Piasek et al. . |
| 3,992,308 | 11/1976 | Malec et al. . |
| 4,038,327 | 7/1977 | Brindell et al. . |
| 4,053,428 | 10/1977 | Pindar et al. . |
| 4,273,891 | 6/1981 | Pindar et al. . |

FOREIGN PATENT DOCUMENTS

| | | |
|---|---|---|
| 738028 | 7/1966 | Canada . |
| 502080 | 3/1939 | United Kingdom . |
| 634960 | 3/1950 | United Kingdom . |
| 1112845 | 3/1968 | United Kingdom . |
| 1278582 | 6/1972 | United Kingdom . |
| 1360892 | 7/1974 | United Kingdom . |

Primary Examiner—Andrew Metz
Attorney, Agent, or Firm—D. A. Polyn; R. F. Keller

[57] ABSTRACT

Compositions useful as lubricant and fuel dispersants are prepared by reacting an intermediate (A) of the formulae

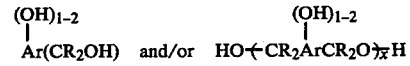

wherein each R is hydrogen or a lower hydrocarbon-based group, Ar is an aromatic moiety having at least one aliphatic substituent of at least 6 carbon atoms and x is 1 to about 10, with an amino compound (B) which contains one or more amino groups having hydrogen bonded directly to an amino nitrogen.

15 Claims, No Drawings

NITROGENOUS DISPERSANTS, LUBRICANTS AND CONCENTRATES CONTAINING SAID NITROGENOUS DISPERSANTS

This application is a continuation of application, Ser. No. 741,184, filed Nov. 12, 1976, now abandoned, which is both: (A) a continuation-in-part of application Ser. No. 701,712, filed July 1, 1976, now abandoned, which in turn, is a continuation-in-part of application Ser. No. 540,470, filed Jan. 13, 1975, now U.S. Pat. No. 3,980,569; and (B) a continuation-in-part of application Ser. No. 613,664, filed Sept. 16, 1975, now U.S. Pat. No. 4,053,428, which is a continuation-in-part of application Ser. No. 540,570, filed Jan. 13, 1975, now U.S. Pat. No. 3,980,569, which is a continuation-in-part of Ser. No. 451,644, filed Mar. 15, 1974, now abandoned.

This invention relates to compositions which are useful in lubricants and fuels. More particularly, it relates to compositions made by reacting a phenolic hydroxy alkyl-substituted intermediate with an amino compound. The invention also relates to fuel, lubricant and additive compositions containing the inventive compositions.

The Mannich reaction between active hydrogen compounds, formaldehyde and compounds containing amino groups is known. It is also known (e.g., from U.S. Pat. Nos. 3,368,972 and 3,649,229) that Mannich bases derived from certain alkylphenols function as dispersants in lubricants and fuels. The preparation of such Mannich bases is described in U.S. Pat. No. 3,737,465.

In view of the increasingly severe conditions under which internal combustion engines are operated, it is of continuing interest to prepare more effective dispersant additives. Due to financial considerations, raw material supplies, and other factors, it is also desirable to develop alternate dispersants and methods for their preparation.

A principal object of the present invention, therefore, is to provide new lubricant and fuel additives.

Another object is to provide improved lubricant, fuel and additive concentrate compositions containing these additives.

These and other objects can be achieved according to the description of the invention provided hereafter.

According to this invention, nitrogen-containing compositions, useful as additives in lubricants and fuels, are prepared by reacting at least one intermediate (A) of the formulae

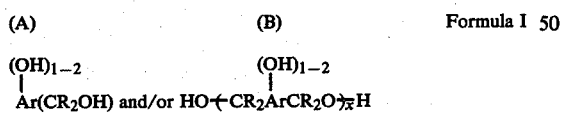

wherein each R is independently hydrogen or lower hydrocarbon-based group; Ar is an aromatic moiety having at least one aliphatic, hydrocarbon-based substituent, R', of at least 6 carbon atoms; and x is an integer of 1 to about 10 with (B) at least one amino compound which contains one or more amino groups having hydrogen bonded directly to an amino nitrogen.

The intermediate (A) is itself prepared by reaction of two reagents.

The first reagent is a hydroxyaromatic compound. This term includes phenols (which are preferred); carbon-, oxygen-, sulfur- and nitrogen-bridged phenols and the like as well as phenols directly linked through covalent bonds (e.g., 4,4'-bis(hydroxy)biphenyl); hydroxy compounds derived from fused-ring hydrocarbons (e.g., naphthols and the like); and dihydroxy compounds such as catechol, resorcinol and hydroquinone. Mixtures of one or more hydroxyaromatic compounds can be used as the first reagent.

The hydroxyaromatic compounds used to make intermediate (A) of this invention are substituted with at least one, and preferably not more than two, aliphatic or alicyclic substituents, R', having an average of at least about 6 (usually at least about 30, more preferably at least about 50) carbon atoms and up to about 7000 carbon atoms. Typically such substituents can be derived from the polymerization of olefins such as ethylene, propylene, 1-butene, 2-butene, isobutene and the like. Both homopolymers (made from a single olefin monomer) and interpolymers (made from two or more of olefin monomers) can serve as sources of these substituents and are encompassed in the term "polymers" as used herein and in the appended claims. Substituents derived from polymers of ethylene, propylene, 1-butene and isobutene are preferred, especially those containing an average of at least about 30 and preferably at least about 50 aliphatic carbon atoms. Generally these substituents contain an average of up to about 700, typically up to about 400 carbon atoms. In some instances, however, higher molecular weight substituents, e.g., those having molecular weights of about 50,000-100,000, are desirable since such substituents can impart viscosity index improving properties to the composition. Such higher molecular weights can be calculated from the inherent or intrinsic viscosity using the Mark-Houwink equation and are called viscosity average molecular weights ($\bar{M}v$). Number average molecular weights ($\bar{M}n$) ranging from about 420 to 10,000 are conveniently measured by vapor pressure osmometry (VPO). (This method is used for the $\bar{M}n$ ranges with about 420 to 10,000 set forth herein.)

The aliphatic and alicyclic substituents, R and R', as well as the aryl nuclei of the hydroxyaromatic compound are generally described as "hydrocarbon-based". The meaning of the term "hydrocarbon-based" as used herein is apparent from the following detailed discussion of "hydrocarbon-based substituent".

As used herein, the term "hydrocarbon-based substituent" denotes a substituent having a carbon atom directly attached to the remainder of the molecule and having predominantly hydrocarbyl character within the context of this invention. Such substituents include the following:

(1) Hydrocarbon substituents, that is aliphatic (e.g., alkyl or alkenyl), alicyclic (e.g., cycloalkyl or cycloalkenyl) substituents, aromatic, aliphatic- and alicyclic-substituted aromatic nuclei and the like, as well as cyclic substituents wherein a ring is completed through another portion of the molecule (that is, any two indicated substituents may together form an alicyclic radical).

(2) Substituted hydrocarbon substituents, that is, those containing non-hydrocarbon radicals which, in the context of this invention, do not alter the predominantly hydrocarbyl character of the substituent. Those skilled in the art will be aware of suitable radicals (e.g., hydroxy, halo, (especially chloro and fluoro), alkoxyl, mercapto, alkyl mercapto, nitro, nitroso, sulfoxy, etc., radicals).

(3) Hetero substituents, that is, substituents which, while predominantly hydrocarbon in character within the context of this invention, contain atoms other than carbon present in a chain or ring otherwise composed of carbon atoms. Suitable hetero atoms will be apparent to those skilled in the art and include, for example, sulfur, oxygen and nitrogen and form substituents such as, e.g., pyridyl, furanyl, thiophenyl, imidazolyl, etc.

In general, no more than about three radicals or hetero atoms, and preferably no more than one, will be present for each 5 carbon atoms in the hydrocarbon-based substituent. Preferably, there will be no more than three radicals per 10 carbon atoms.

Preferably, the hydrocarbon-based substituents in the compositions of this invention are free from acetylenic unsaturation. Ethylenic unsaturation, when present, preferably will be such that no more than one ethylenic linkage will be present for every 10 carbon-to-carbon bonds in the substituent. The hydrocarbon-based substituents are usually hydrocarbon in nature and more usually, substantially saturated hydrocarbon. As used in this specification and the appended claims, the word "lower" denotes substituents, etc. containing up to seven carbon atoms; for example, lower alkoxy, lower alkyl, lower alkenyl, lower aliphatic aldehyde.

Introduction of the aliphatic or alicyclic substituent R' onto the phenol or other hydroxyaromatic compound is usually effected by mixing a hydrocarbon (or a halogenated derivative thereof, or the like) and the phenol at a temperature of about 50°-200° C. in the presence of a suitable catalyst, such as aluminum trichloride, boron trifluoride, zinc chloride or the like. See, for example, U.S. Pat. No. 3,368,972 which is incorporated by reference for its disclosures in this regard. The substituent can also be introduced by other alkylation processes known in the art.

The phenols used to make intermediate (A) have the general formula

   Formula II

Especially preferred as the first reagent are monosubstituted phenols of the general formula

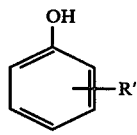   Formula III wherein R' is an aliphatic or alicyclic hydrocarbon-based substituent of $\overline{M}n$ (VPO) of about 420 to about 10,000. Typically, R' is an alkyl or alkenyl group of about 30 to about 400 carbons.

The second reagent used to make the intermediate (A) is a hydrocarbon-based aldehyde, preferably a lower aliphatic aldehyde. Suitable aldehydes include formaldehyde, benzaldehyde, acetaldehyde, the butyraldehydes, hydroxybutyraldehydes and heptanals, as well as aldehyde precursors which react as aldehydes under the conditions of the reaction such as paraformaldehyde, hexamethylene tetraamine, paraldehyde formalin and methal. Formaldehyde and its polymers (e.g., paraformaldehyde, trioxane) are preferred. Mixtures of aldehydes may be used as the second reagent.

In making intermediate (A) of this invention, the hydroxyaromatic compound is reacted with the aldehyde in the presence of an alkaline reagent, at a temperature up to about 125° C. and preferably about 50°-125° C.

The alkaline reagent is typically a strong inorganic base such as an alkali metal base (e.g., sodium or potassium hydroxide). Other inorganic and organic bases can be used as the alkaline base such as $Na_2CO_3$, $NaHCO_3$, sodium acetate, pyridine, and hydrocarbon-based amines (such as methylamine, aniline, and alkylene polyamines, etc.) may also be used. Mixtures of one or more alkaline bases may be used.

The relative proportions of the various reagents employed in the first step are not critical; it is generally satisfactory to use about 1-4 equivalents of aldehyde and about 0.05-10.0 equivalents of alkaline reagent per equivalent of hydroxyaromatic compound. (As used herein, the term "equivalent" when applied to a hydroxyaromatic compound indicates a weight equal to the molecular weight thereof divided by the number of aromatic hydroxyl groups directly bonded to an aromatic ring per molecule. As applied to the aldehyde or precursors thereof, an "equivalent" is the weight required to produce one mole of monomeric aldehyde. An equivalent of alkaline reagent is that weight of reagent that when dissolved in one liter of solvent will give a normal solution. One equivalent of alkaline reagent will neutralize, i.e., bring to pH 7.0, a 1.0 normal solution of, e.g., hydrochloric or sulfuric acid.)

It is generally convenient to carry out the formation of intermediate (A) in the presence of a substantially inert, organic liquid diluent, which may be a volatile or nonvolatile. A substantially inert, organic liquid diluent which may or may not dissolve all the reactants, is a material which does not substantially react with the reagents under the reaction conditions. Suitable diluents include hydrocarbons such as naphtha, textile spirits, mineral oil (which is preferred), synthetic oils (as described hereinbelow), benzene, toluene and xylene; alcohols such as isopropanol, n-butanol, isobutanol and 2-ethylhexanol; ethers such as ethylene or diethylene glycol mono- or diethyl ether; or the like, as well as mixtures thereof.

The reaction mixture containing the intermediate (A) formed as just described is usually substantially neutralized. This is an optional step and it is not always employed. Neutralization can be effected with any suitable acidic material, typically a mineral acid or an organic acid or anhydride. Acidic gases such as carbon dioxide, hydrogen sulfide, and sulfur dioxide may also be used. Preferably neutralization is accomplished with carboxylic acids, especially lower hydrocarbon-based carboxylic acid such as formic, acetic or butyric acid. Mixtures of one or more acidic materials can be used to accomplish neutralization. The temperature of neutralization is up to about 150° C., preferably about 50°-150° C. Substantial neutralization means the reaction mixture is brought to a pH ranging between about 4.5 and 8.0. Preferably, the reaction mixture is brought to a minimum pH of about 6 or a maximum of about 7.5.

Intermediate (A) is usually a mixture of hydroxyalkyl derivatives of the hydroxyaromatic compound and ether condensation products thereof having the general formulae:

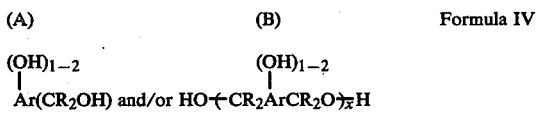

wherein R, Ar an x are as defined hereinabove.

Typically, when the intermediate (A) is made from mono-substituted phenols, it is a mixture of compounds of the general formulae:

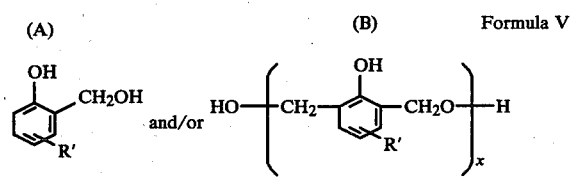

wherein R' is a substantially saturated aliphatic hydrocarbyl group of about 30 to about 700 carbon atoms.

A particular preferred class of intermediate (A) are those made from para-substituted phenols and having the general formulae:

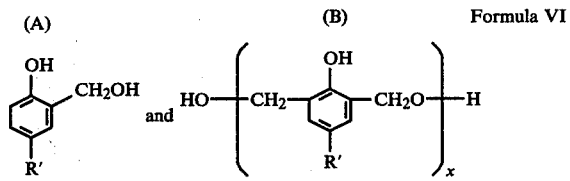

wherein R' is an alkyl or alkenyl group of about 30 to about 400 carbons and x is an integer of 1 to about 10. Exemplary of R' in these preferred intermediates are those made from polybutenes. These polybutenes are usually obtained by polymerization of a $C_4$ refinery stream having a butene content of 35 to 75 weight percent and isobutene content of 30 to 60 weight percent in the presence of a Lewis acid catalyst such as aluminum trichloride or boron trifluoride. They contain predominantly (greater than 80% of total repeat units) isobutylene repeating units of the configuration

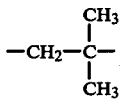

In other preferred intermediates, the R' is derived from a polypropylene polymer or an ethylene/propylene interpolymer containing an appropriate number of carbon atoms.

The intermediate (A) is reacted with at least one amino compound (B) which contains one or more amino groups having hydrogen directly bonded to amino nitrogen. Suitable amino compounds are those containing only primary, only secondary, or both primary and secondary amino groups, as well as polyamines in which all but one of the amino groups may be tertiary. Suitable amino compounds include ammonia, aliphatic amines, aromatic amines, heterocyclic amines and carbocyclic amines, as well as polyamines such as alkylene amines, arylene amines, cyclic polyamines and the hydroxy-substituted derivatives of such polyamines.

Mixtures of two or more amino compounds can be used as the amino compound.

Specific amines of these types are methylamine, N-methylethylamine, N-methyl-octylamine, N-cyclohexyl-aniline, dibutylamine, cyclohexylamine, aniline, di(p-methyl-phenyl)-amine, ortho, meta and para-aminophenol, dodecylamine, octadecylamine, o-phenylenediamine, N,N'-di-n-butyl-p-phenylenediamine, morpholine, N,N-di-n-butyl-p-phenylene-diamine, piperazine, tetrahydropyrazine, indole, hexahydro-1,3,5-triazine, 1-H-1,2,4-triazole, bis-(p-aminophenyl)-methane, menthanediamine, cyclohexamine, pyrrolidine, 3-amino-5,6-diphenyl-1,2,4-triazine, quinonediimine, 1,3-indanediimine, 2-octadecyl-imidazoline, 2-phenyl-4-methylimidazoline, oxazolidine, ethanolamine, diethanolamine, N-3-aminopropyl morpholine, phenothiazine, 2-heptyl-oxazolidine, 2-heptyl-3-(2-aminopropyl)imidazoline, 4-methylimidazoline, 1,3-bis(2-aminoethyl)imidazoline, 2-heptadecyl-4-(2-hydroxyethyl)imidazoline and pyrimidine.

A preferred group of amino compounds consists of polyamines, especially alkylene polyamines conforming for the most part to the formula

wherein n is an integer of 1 to about 10, A is a hydrocarbon-based substituent or hydrogen atom, preferably a lower alkyl group or a hydrogen atom, and the alkylene radical is preferably a lower alkylene radical of up to 7 carbon atoms. Mixtures of such polyamines are similarly useful. In certain instances, two A groups on the same amino nitrogen can be combined together, sometimes through a nitrogen atom and other times through carbon-to-carbon bonds to form a five or six membered ring including the amino nitrogen, two A groups and, optionally, oxygen or nitrogen.

The alkylene polyamines include principally polymethylene amines, ethylene amines, butylene amines, propylene amines, trimethylene amines, pentylene amines, hexylene amines, heptylene amines, octylene amines, and also the cyclic and the higher homologs of such amines such as piperazines and aminoalkyl-substituted piperazines. They are exemplified specifically by: ethylene diamine, triethylene tetramine, propylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 1-(2-aminopropyl)piperazine, 1,4-bis(2-aminoethyl)piperazine, and 2-methyl-1-(2-aminobutyl)piperazine. Higher homologs such as are obtained by condensing two or more of the above-illustrated alkylene amines likewise are useful. Examples of amines wherein two A groups are combined to form a ring include N-aminoethyl morpholine, N-3-aminopropyl-pyrrolidene, etc.

The ethylene polyamines are especially useful. They are described in some detail under the heading "Diamines and Higher Amines" in "Encyclopedia of Chemical Technology", Second Edition, Kirk and Othmer, Volume 7, pages 27–39, Interscience Publishers, New York (1965). Such compounds are prepared most conveniently by the reaction of an alkylene chloride with ammonia. The reaction results in the production of somewhat complex mixtures of alkylene polyamines, including cyclic condensation products such as piperazines. These mixtures find use in the process of this invention. On the other hand, quite satisfactory products may be obtained also by the use of pure alkylene polyamines. An especially useful alkylene polyamine for reasons of economy as well as effectiveness of the products derived therefrom is a mixture of ethylene amines prepared by the reaction of ethylene chloride and ammonia and containing about 3-7 amino groups per molecule.

Hydroxyalkyl-substituted alkylene polyamines, i.e., alkylene polyamines having one or more hydroxyalkyl substituents on the nitrogen atoms, likewise are contemplated for use herein. The hydroxyalkyl-substituted alkylene polyamines are preferably those in which the alkyl group is a lower alkyl group, i.e., an alkyl having less than 8 carbon atoms. Examples of such amines include N-(2-hydroxyethyl)-ethylene diamine, N,N'-bis(2-hydroxyethyl)ethylene diamine, 1-(2-hydroxyethyl)piperazine, mono-2-hydroxypropyl-substituted diethylene triamine, 1,4-bis(2-hydroxypropyl)piperazine, dihydroxypropyl-substituted tetraethylene pentamine, N-(3-hydroxypropyl)tetramethylene diamine, etc.

Higher homologs such as are obtained by condensation of the above-illustrated alkylene polyamines or hydroxyalkyl-substituted alkylene polyamines through amino radicals or through hydroxy radicals are likewise useful. It will be appreciated that condensation through amino radicals results in a higher amine accompanied by removal of ammonia and that condensation through the hydroxy radicals results in products containing ether linkages accompanied by removal of water.

Another preferred class of amino compounds are aromatic amines containing about 6 to about 30 carbon atoms and at least one primary or secondary amino group. Preferably, these aromatic amines contain only 1-2 amino groups, 1-2 hydroxy groups, carbon and hydrogen. Examples include aryl amines such as the isomeric amino phenols, aniline, N-lower alkyl anilines, heterocyclic amines such as the isomeric amino pyridines, the isomeric naphthyl amines, phenothiazine, and the $C_{1-30}$ hydrocarbyl substituted analogs such as N-phenyl-alpha-naphthyl amine. Aromatic diamines such as the phenylene and naphthylene diamines can also be used.

Other suitable amino compounds include ureas, thioureas, (including lower alkyl and monohydroxy lower alkyl substituted ureas and thioureas), hydroxylamines, hydrazines, guanidines, amidines, amides, thioamides, cyanamides, amino acids and the like. Specific examples illustrating such compounds are: hydrazine, phenylhydrazine, N,N'-diphenylhydrazine, octadecylhydrazine, benzoylhydrazine, urea, thiourea, N-butylurea, stearylamide, oleylamide, guanidine, 1-phenylguanidine, benzamidine, octadecamidine, N,N'-dimethylstearamidine, cyanamide, dicyandiamide, guanylurea, aminoguanidine, iminodiacetic acid, iminodipropionitrile, etc.

The intermediate (A) is reacted with the amino compound (B), typically at a temperature between about 25° C. and about 225° C. and usually about 55°-180° C. The ratio of reactants in this step is not critical but about 1-6 equivalents of amino compound (B) are generally employed per equivalent of intermediate (A). (The equivalent weight of the amino compound is the molecular weight thereof divided by the number of hydrogens bonded to nitrogen atoms present per molecule and the equivalent weight of the intermediate (A) is its molecular weight divided by the number of —CR$_2$O— units present derived from the aldehyde. The number of equivalents of (A) is conventionally calculated by dividing the moles of (A) by the moles of aldehyde used to make it.) It is frequently convenient to react (A) and (B) in the presence of a substantially inert liquid solvent/diluent, such as that described hereinabove.

The course of the reaction between the intermediate (A) and the amino compound (B) may be determined by measuring the amount of water removed by distillation, azeotropic distillation or the like. When water evolution has ceased, the reaction may be considered complete and any solids present may be removed by conventional means; e.g., filtration, centrifugation, or the like, affording the desired product. It is ordinarily unnecessary to otherwise isolate the product from the reaction mixture or purify it, though, in some instances it may be desirable to concentrate (e.g., by distillation) or dilute the solution/dispersion of the product for ease of handling, etc.

The method of this invention is illustrated by the following examples. All parts are by weight and all molecular weights are determined by V.P.O. unless otherwise indicated.

EXAMPLE 1

A mixture of 1560 parts (1.5 equivalents) of a polyisobutylphenol having a molecular weight of about 885, 1179 parts of mineral oil and 99 parts of n-butyl alcohol is heated to 80° C. under nitrogen, with stirring, and 12 parts (0.15 equivalent) of 50% aqueous sodium hydroxide solution is added. The mixture is stirred for 10 minutes and 99 parts (3 equivalents) of paraformaldehyde is added. The mixture is stirred at 80°-88° C. for 1.75 hours and then neutralized with 9 parts (0.15 equivalent) of acetic acid.

To the solution of intermediate thus obtained is added at 88° C., with stirring, 172 parts of a commercial polyethylene polyamine mixture containing about 3-7 nitrogen atoms per molecule and about 34.5% by weight nitrogen. The mixture is heated over about 2 hours to 150° C. and stirred at 150°-160° C. for three hours, with volatile material being removed by distillation. The remainder of the volatiles are then stripped at 160° C./30 torr, and the residue filtered at 150° C., using a commercial filter aid material, to yield the desired product as a filtrate in the form of 60% solution in mineral oil containing 1.95% nitrogen.

EXAMPLE 2

A solution of 4576 parts (4.4 equivalents) of the polyisobutylphenol of Example 1 in 3226 parts of mineral oil is heated to 55° C. under nitrogen, with stirring, and 18 parts (0.22 equivalent) of 50% aqueous sodium hydroxide solution is added. The mixture is stirred for 10 minutes and then 320 parts (9.68 equivalents) of paraformaldehyde is added. The mixture is heated at 70°-80° C. for 13 hours and then cooled to 60° C. whereupon 20 parts (0.33 equivalent) of acetic acid is added. The mixture is then heated at 110° C. for 6 hours while being blown with nitrogen to remove volatile materials. Nitrogen blowing is continued at 130° C. for an additional 6 hours, after which the solution is filtered at 120° C., using a filter aid material.

To the above solution of intermediate (i.e., alkylphenol/formaldehyde condensate), at 65° C. is added 184 parts of the polyethylene polyamine of Example 1. The mixture is heated at 110°-135° C. over 4 hours and then blown with nitrogen at 150°-160° C. for 5 hours to remove volatiles. Mineral oil, 104 parts, is added and the mixture filtered at 150° C., using filter aid, to yield the desired product as a 60% solution in mineral oil containing 1.80% nitrogen.

EXAMPLE 3

To 366 parts (0.2 equivalent) of the intermediate solution described in Example 2 is added at 60° C., with stirring, 43.4 parts (0.3 equivalent) of N-(3-aminopropyl)morpholine. The mixture is heated at 110°–130° C., with nitrogen blowing, for 5 hours. It is then stripped of volatiles at 170° C./16 torr, and filtered using a filter aid material. The filtrate is the desired product (as a 62.6% solution in mineral oil) containing 1.41% nitrogen.

EXAMPLE 4

Following the procedure of Example 3, a reaction product is prepared from 366 parts (0.2 equivalent) of the intermediate solution of Example 2 and 31.5 parts (0.3 equivalent) of diethanolamine. It is obtained as a 62.9% solution in mineral oil, containing 0.70% nitrogen.

EXAMPLE 5

A mixture of 2600 parts (2.5 equivalents) of the polyisobutylphenol of Example 2, 750 parts of textile spirits and 20 parts (0.25 equivalent) of 50% aqueous sodium hydroxide is heated to 55° C. under nitrogen, with stirring, and 206 parts (6.25 equivalents) of paraformaldehyde is added. Heating at 50°–55° C., with stirring, is continued for 21 hours after which the solution is blown with nitrogen and heated to 85° C. as volatile materials are removed. Acetic acid, 22 parts (0.37 equivalent), is added over one-half hour at 85°–90° C., followed by 693 parts of mineral oil.

To 315 parts (0.231 equivalent) of the solution of alkylphenol/formaldehyde intermediate prepared as described above is added under nitrogen, at 65° C., 26.5 parts of the polyethylene polyamine mixture of Example 1. The mixture is heated at 65°–90° C. for about 1 hour, and then heated to 120°–130° C. with nitrogen blowing, and finally to 145°–155° C. with continued nitrogen blowing for 3.5 hours. Mineral oil, 57 parts, is added and the solution filtered at 120° C., using a filter aid material. The filtrate is the desired product (69.3% solution in mineral oil) containing 2.11% nitrogen.

EXAMPLE 6

A solution of 340 parts (0.25 equivalent) of the alkylphenol/formaldehyde intermediate solution of Example 5 in 128 parts of mineral oil is heated to 45° C. and 30 parts (0.25 equivalent) of tris-(methylol)methyl amine is added, with stirring. The mixture is heated to 90° C. over 0.5 hours, and then blown with nitrogen at 90°–130° C. for 3 hours, with stirring. Finally, it is heated to 150°–160° C. for 5 hours, with nitrogen blowing, cooled to 125° C. and filtered, using a filter aid material. The filtrate is the desired product (as a 60% solution in mineral oil) containing 0.19% nitrogen.

EXAMPLE 7

To a mixture of 1560 parts (1.5 equivalents) of the polyisobutylphenol of Example 2 and 12 parts (0.15 equivalent) of 50% aqueous sodium hydroxide solution is added at 68° C., with stirring, 99 parts (3 equivalents) of paraformaldehyde. The addition period is 15 minutes. The mixture is then heated to 88° C. and 100 parts of a mixture of isobutyl and primary amyl alcohols is added. Heating at 85°–88° C. is continued for 2 hours and then 16 parts of glacial acetic acid is added and the mixture stirred for 15 minutes and vacuum stripped at 150° C. To the residue is added 535 parts of mineral oil, and the oil solution is filtered to yield the desired intermediate.

To 220 parts (0.15 equivalent) of the intermediate solution prepared as described above is added 7.5 parts (0.15 equivalent) of hydrazine hydrate. The mixture is heated to 80°–105° C. and stirred at that temperature for 4 hours. Acetic acid, 0.9 part, is then added and stirring is continued at 95°–125° C. for an additional 6 hours. A further 7.5-part-portion of hydrazine hydrate is added and heating and stirring are continued for 8 hours, after which the product is stripped of volatiles under vacuum at 124° C. and 115 parts of mineral oil is added. Upon filtration, the desired product (as a 50% solution in mineral oil) is obtained; it contains 1.19% nitrogen.

EXAMPLE 8

A mixture of 6240 parts (6 equivalents) of the polyisobutylphenol of Example 2 and 2814 parts of mineral oil is heated to 60° C. and 40 parts (0.5 equivalent) of 50% aqueous sodium hydroxide solution added, with stirring. The mixture is stirred for 0.5 hour at 60° C., and 435 parts (13.2 equivalents) of 91% aqueous formaldehyde solution is added at 75°–77° C. over 1 hour. Stirring at this temperature is continued for 10 hours, after which the mixture is neutralized with 30 parts of acetic acid and stripped of volatile materials. The residue is filtered using a filter aid material.

A mixture of 629 parts (0.4 equivalent) of the resulting intermediate solution and 34 parts (0.4 equivalent) of dicyandiamide is heated to 210° C. under nitrogen, with stirring, and maintained at 210°–215° C. for 4 hours. It is then filtered through a filter aid material and the filtrate is the desired product (as a 71% solution in mineral oil) containing 1.04% nitrogen.

EXAMPLE 9

A mixture of 1792 parts (1.6 equivalents) of the polyisobutylphenol of Example 2 and 1350 parts of xylene is heated to 60° C. and 12.8 parts (0.16 equivalent) of 50% aqueous sodium hydroxide solution added, with stirring. The mixture is stirred at 60°–65° C. for 10 minutes, and then 108 parts (3.28 equivalents) of paraformaldehyde is added. Heating is continued at 65°–75° C. for 5 hours, after which 14.3 parts (0.24 equivalent) of acetic acid is added. The acidified mixture is heated at 75°–125° C. for ½ hour and then stripped under vacuum. The resulting solution of intermediate is filtered through a filter aid material.

To 2734 parts (1.4 equivalents) of the above-described intermediate solution, maintained at 65° C., is added 160.7 parts of the polyethylene polyamine of Example 1. The mixture is heated for 1½ hours at 65°–110° C. and for 1½ hours at 110°–140° C., after which heating at 140° C. is continued with nitrogen blowing for 11 hours, while a xylene-water azeotrope is collected by distillation. The residual liquid is filtered at 100° C., using a filter aid material, and the filtrate is the desired product as a 60% solution in xylene containing 1.79% nitrogen.

EXAMPLE 10

A mixture of 3740 parts (2 equivalents) of a polyisobutylphenol in which the polyisobutyl substituent has a molecular weight of about 1600, 1250 parts of textile spirits and 2000 parts of isopropyl alcohol is stirred and 352 parts (2.2 equivalents) of 50% aqueous sodium hydroxide solution is added, followed by 480 parts (6 equivalents) of 38% aqueous formaldehyde solution. The mixture is stirred for 2 hours, allowed to stand for 2 days and then stirred again for 17 hours. Acetic acid, 150 parts (2.5 equivalents), is added and the mixture is stripped of volatile materials under vacuum. The remaining water is removed by adding benzene and azeotropically distilling; during the distillation, 1000 parts of mineral oil is added in 2 portions. The residue is filtered through a filter aid material to yield a solution of the desired intermediate.

To 430 parts (0.115 equivalent) of the intermediate solution, at 90° C., is added with stirring 14.1 parts of the polyethylene polyamine of Example 1. The mixture is heated at 90°–120° C. for 2 hours and then at 150°–160° C. for 4 hours, with nitrogen blowing. After all volatile materials have been removed, the resulting solution is filtered to yield the desired product as a 52% solution in mineral oil which contains 1.03% nitrogen.

EXAMPLE 11

A solution of 6650 parts (25 equivalents) of tetrapropylphenol in 2000 parts of toluene is heated to 55° C. with stirring, and 200 parts (2.5 equivalents) of 50% aqueous sodium hydroxide solution is added, followed by 1820 parts (55 equivalents) of paraformaldehyde (over 15 minutes). During the paraformaldehyde addition, the temperature rises to 100° C. The mixture is blown with nitrogen and cooled to 85° C., whereupon 150 parts of acetic acid is added to it. Water is removed by azeotropic distillation and the remaining product is filtered through a filter aid material.

A mixture of 555 parts (1.5 equivalents) of the intermediate thus obtained, 300 parts of isopropyl alcohol, 100 parts of xylene and 270 parts (3 equivalents) of guanidine carbonate is heated under reflux for 12 hours. Xylene, 200 parts, is then added and volatiles are removed by distilling at 110° C. The mixture is filtered and the solids are washed with xylene; the combined filtrate and washings are vacuum stripped and 600 parts of mineral oil are added. Stripping of volatile materials is continued and the remaining liquid filtered through a filter aid material. The filtrate is the desired product as a 48% solution in mineral oil which contains 3.17% nitrogen.

EXAMPLE 12

A tetrapropylphenol-formaldehyde intermediate is prepared by a method similar to that described in Example 11. A mixture of 393 parts (1 equivalent) of that intermediate, 168 parts (2 equivalents) of dicyandiamide, 250 parts of isopropyl alcohol and 458 parts of mineral oil is heated to reflux and maintained at that temperature for about 9 hours. Volatiles are then removed by vacuum stripping and the residual liquid filtered using a filter aid material. The filtrate is the desired product as a 50% solution in mineral oil containing 4.41% nitrogen.

EXAMPLE 13

A mixture of 393 parts (1 equivalent) of the tetrapropylphenol-formaldehyde intermediate of Example 12, 318 parts (1.63 equivalents) of disodium iminodiacetate and 400 parts of xylene is heated under reflux for about 18 hours and is then filtered. The desired product is obtained as the filtrate (45% solution in xylene); this solution contains 0.04% nitrogen.

EXAMPLE 14

A mixture of 131 parts (0.33 equivalent) of the tetrapropylphenol-formaldehyde intermediate of Example 12, 41 parts (1 equivalent) of 3,3-iminodipropionitrile and 200 parts of xylene is heated at 120°–130° C. for 6.5 hours and is then stripped of volatile materials under vacuum. The residual liquid is filtered through a filter aid material and the material on the filter is washed with 200 parts of xylene. The combined filtrate and washings are concentrated to yield an 86% solution in xylene of the desired product containing 8.60% nitrogen.

EXAMPLE 15

The tetrapropylphenol-formaldehyde intermediate of Example 12 (589 parts, 1.5 equivalents) is heated to 62° C. and 324 parts (4 equivalents) of aminopropyldiethanolamine added over 1 hour at 62°–89° C. The mixture is heated for 1 hour at 89°–120° C. and then blown with nitrogen as water is removed by azeotropic distillation. Heating of the residual liquid at 140°–162° C. for 5 hours removes additional water. The mixture is then cooled and 200 parts of xylene is added. The liquid is filtered, using a filter aid material, and the filtrate is the desired product as a 71% solution in xylene containing 5.76% nitrogen.

EXAMPLE 16

A mixture of 2589 parts (7 equivalents) of a polyisobutylphenol in which the polyisobutyl substituent has a molecular weight of about 330, 56 parts (0.7 equivalent) of 50% aqueous sodium hydroxide solution and 1000 parts of toluene is heated to 65° C. and 254 parts (7.7 equivalents) of paraformaldehyde added. The mixture is heated with stirring at 65°–85° C. for about 1 hour, and an additional 254 parts (7.7 equivalents) of paraformaldehyde added. Heating is continued at 69°–76° C. for 2 hours, whereupon 42 parts (0.7 equivalents) of acetic acid is added. Volatile materials are then removed by azeotropic distillation under vacuum and the remaining liquid is filtered through a filter aid material.

To 457 parts (1.5 equivalents) of the intermediate thus obtained is added 162 parts (2 equivalents) of aminopropyldiethanolamine. The mixture is heated under reflux, with azeotropic removal of water, for about 2 hours and then at 140°–160° C. for about 8 hours. It is then cooled to 130° C. and 165 parts of mineral oil is added. The remaining toluene is removed by distillation and the residual liquid filtered. The filtrate is the desired product as a 75% solution in mineral oil and contains 4.16% nitrogen.

Examples 17 to 20 describe the preparation of intermediates for preparing dispersants of this invention and are carried out, with variations noted in Table A by the following procedure: A mixture of the polybutenyl-substituted phenol, mineral oil, n-butanol, sodium hydroxide and paraformaldehyde is heated at 82°–87° C. for three hours. Glacial acetic acid is then added and stirred for one-half hour to provide a mixture containing the desired intermediate. These intermediates are converted to the desired dispersants by the means described in Examples 21–28.

TABLE A

| EXAMPLE No. | Polybutyl-substituted Phenol | | Paraformaldehyde Parts by Wt. | Sodium Hydroxide eq. | Solvent | | Acetic Acid eq. |
|---|---|---|---|---|---|---|---|
| | $\overline{M}n$ (VPO) | Parts by Wt. | | | n-butanol Parts by Wt. | Mineral Oil Parts by Wt. | |
| 17 | 1340 | 850 | 35 | 0.053 | 35 | 614 | 0.053 |
| 18 | 920 | 4200 | 231 | 0.35 | 231 | 2400 | 0.35 |
| 19 | 960 | 520 | 33 | 0.05 | 33 | 412 | 0.05 |
| 20 | 1300 | 960 | 39.6 | 0.06 | 40 | 729 | 0.06 |

EXAMPLE 21

The intermediate solution prepared in Example 17 is heated to 120° C. and 58 parts of o-aminophenol added. The reaction mixture is heated at 115°–140° C. for two hours, then stripped to 160° C. under vacuum and filtered. The filtrate is the desired product (60% solution in mineral oil, containing 0.30% nitrogen).

EXAMPLE 22

The intermediate solution prepared in Example 18 is stripped to 100° C. under vacuum and filtered to yield 6430 parts of a 65% oil solution of intermediate.

EXAMPLE 23

The intermediate solution prepared in Example 22, 970 parts, is heated to 75° C. and 79 parts of sulfanilic acid added. The mixture is heated at 160°–200° C. for 11 hours as water is removed while blowing with nitrogen. The mixture is filtered at 150° C. to yield the desired product (65% solution in mineral oil).

EXAMPLE 24

The intermediate solution prepared in Example 22, 970 parts, 75 parts of n-butanol and 30 parts of glycine is heated at 170°–175° C. for 11 hours as distillate is removed while blowing with nitrogen. The mixture is filtered to yield the desired product (65% oil solution, containing 0.24% nitrogen).

EXAMPLE 25

The intermediate solution prepared in Example 17 is heated to 120° C. and 56.3 parts of aniline is added. The reaction mixture is heated at 155°–180° C. for 8 hours, then stripped to 190° C. under vacuum and filtered to yield the desired product (60% solution in mineral oil, containing 0.34% nitrogen).

EXAMPLE 26

The intermediate solution prepared in Example 17 is heated at 125° C. for 1.5 hours as distillate is removed while blowing with nitrogen. The reaction mixture is cooled to 70° C., and 180 parts of p-aminophenol and 75 parts of n-butanol are added. The mixture is heated at 148° C. for 3 hours and water removed by azeotropic distillation; the mixture is then stripped to 160° C. under vacuum and filtered. The filtrate is the solution/dispersion product which contains 40% mineral oil and 0.32% nitrogen.

EXAMPLE 27

The intermediate solution prepared in Example 18 is heated to 85° C. and 84.5 parts of diphenylamine is added. The reaction mixture is heated at 150°–160° C. for 4 hours and water is removed by azeotropic distillation; the mixture is then stripped to 160° C. under vacuum. The mixture is filtered to yield the desired product (60% solution in mineral oil, containing 0.52% nitrogen).

EXAMPLE 28

The intermediate solution prepared in Example 20 is heated at 120° C. for 1.5 hours as water is removed by a Dean-Stark trap while blowing with nitrogen. Phenothiazine, 119 parts, is added and the mixture heated at 150°–170° C. for 5 hours, then stripped at 170° C. under vacuum. The mixture is filtered to yield the desired product (60% solution in mineral oil, which contains 0.43% nitrogen and 1.07% sulfur.)

EXAMPLE 29

Example 29 is carried out in essentially the same manner as Example 1, except that the 1-butanol solvent/diluent is omitted and the mineral oil solvent/diluent is replaced by an equal amount of xylene. Filtration at 100°–90° C./170 torr through filter aid provides a xylene solution of the desired intermediate which contains 39.4% xylene and is useful as an additive for gasoline.

EXAMPLE 30

A mixture of 3840 parts of a polyisobutyl-substituted phenol (wherein the polybutyl substituent has an average of 100 carbon atoms), 158 parts of 1-butanol and 2828 parts of diluent mineral oil is heated to 80° C. and 19 parts of 50% aqueous sodium hydroxide added to it. To this stirred mixture is then added 158 parts of paraformaldehyde. The mixture is held at 80°–88° C. for 3.5 hours. At this point an infrared spectrum of the mixture indicates the absence of substantial absorption at 12.0 microns. The reaction mixture is neutralized with 14 parts of glacial acetic acid to provide an oil/alcohol solution of the desired intermediate.

EXAMPLE 31

A mixture of 450 parts of a polypropylene-substituted phenol (the polypropylene substituent having a $\overline{M}n=860$), 25 parts paraformaldehyde and 3 parts of 50% aqueous NaOH, 100 parts of xylene and 25 parts normal butanol is heated at 80°–90° C. for 3 hours. Then 2.3 parts of glacial acetic acid is added to neutralize the intermediate mixture. The polyethylene polyamine described in Example 1 (45 parts) is added and the mixture is heated to 160° C. for 5 hours while distillate collects. The mixture is stripped at 165° C./15 torr and filtered to provide as a filtrate the desired product containing 2.98% nitrogen.

To this solution is added 344 parts of the commercial polyethylene mixture described in Example 1. The mixture is heated from 88° C. to 120° C. over 1.5 hours, from 120°–150° C. over 1.25 hours, and 150°–155° C. over 4.5 hours. The mixture is then heated from 155°–157° C. for 5 hours while a slow stream of nitrogen is passed through it. Approximately 250 parts of distillate is collected from the mixture. The mixture is stripped to 150° C./10 torr and the residue filtered at that temperature to provide an oil solution of desired product containing 40% oil and 1.58% nitrogen.

As previously indicated, the compositions of this invention are useful as additives for lubricants where they function primarily as sludge dispersants and detergents. Such dispersants and detergents disperse and remove from engine surfaces sludge which forms in the lubricant during use. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, such as automobile and truck engines, two-cycle engines, aviation piston engines, marine and railroad diesel engines, and the like. They can also be used in gas engines, jet aircraft turbines, stationary power engines and turbines and the like. Automatic transmission fluids, transaxle lubricants, gear lubricants, metal-working lubricants, hydraulic fluids and other lubricating oil and grease compositions can also benefit from the incorporation therein of the compositions of the present invention.

Natural oils include animal oils and vegetable oils (e.g., castor oils, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono-and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, alkyl succinic acids, alkenyl succinic acids, maleic acid, azelaic acid, suberic acid, sebacic acid, fumeric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester or decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In general, about 0.05–20.0 parts (by weight) of the composition of this invention is dissolved or stably dispersed in 100 parts of oil to produce a satisfactory lubricant. The invention also contemplates the use of other additives in combination with the composition of this invention. Such additives include, for example, auxiliary detergents and dispersants of the ash-producing or ashless type, oxidation inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus cids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, $C_{6-26}$ alkylphenols, thiophenol, sulfurized alkylphenol, and condensation products of formaldehyde with a phenolic substance; $C_{1-20}$ alcohols such as methanol, 2-propanol, octyl alcohol, cellosolve, carbitol, ethylene glycol, stearyl alcohol, and cyclohexyl alcohol; and $C_{1-20}$ amines such as aniline, phenylenediamine, phenothiazine, phenyl-b-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amines, organic hydroxy compounds such as phenols and alcohols, and/or basic inorganic materials. Examples of these "carboxylic dispersants" are described in British Pat. No. 1,306,529 and in many U.S. Patents, including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described, for example, in the following U.S. Patents:

| | |
|---|---|
| 3,275,554 | 3,454,555 |
| 3,438,757 | 3,565,804 |

(3) Products obtained by post-treating the carboxylic or amine dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Patents:

| | | |
|---|---|---|
| 3,036,003 | 3,367,943 | 3,579,450 |
| 3,087,936 | 3,373,111 | 3,591,598 |
| 3,200,107 | 3,403,102 | 3,600,372 |
| 3,216,936 | 3,442,808 | 3,639,242 |
| 3,254,025 | 3,455,831 | 3,649,229 |
| 3,256,185 | 3,455,832 | 3,649,659 |
| 3,278,550 | 3,493,520 | 3,658,836 |
| 3,280,234 | 3,502,677 | 3,697,574 |
| 3,281,428 | 3,513,093 | 3,702,757 |
| 3,282,955 | 3,533,945 | 3,703,536 |
| 3,312,619 | 3,539,633 | 3,704,308 |
| 3,366,569 | 3,573,010 | 3,708,522 |

(4) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Patents:

| | |
|---|---|
| 3,329,658 | 3,666,730 |
| 3,449,250 | 3,687,849 |
| 3,519,565 | 3,702,300 |

The pertinent disclosures of all of the above-noted patents are incorporated by reference herein.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphneol, sulfurized dipentene, and sulfurized terpene; phosphosulfurized hydrocarbons such as the reaction products of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The fuel compositions of the present invention contain a major proportion of a normally liquid fuel, usually a hydrocarbonaceous petroleum distillate fuel such as aviation or motor gasoline as defined by STM Specification D-439-73 and diesel fuel or fuel oil as defined by ASTM Specification D-396. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated. Examples of such mixtures are combinations of gasoline and ethanol, diesel fuel and ether, gasoline and nitromethane, etc. Particularly preferred is gasoline, that is, a mixture of hydrocarbons having an ASTM boiling point of 60° C. at the 10% distillation point to about 205° C. at the 90% distillation point.

Generally, these fuel compositions contain an amount of the compositions of this invention sufficient to impart dispersant and detergent properties to the fuel; usually this amount is about 1 to about 10,000 preferably 4 to 1,000 parts by weight of the reaction product per million parts by weight of fuel. The preferred gasoline-based fuel compositions generally exhibit excellent engine oil sludge dispersancy and detergency properties. In addition, they exhibit anti-rust and carburetor/fuel line deposit-removing and deposit-inhibiting properties.

The fuel compositions of this invention can contain, in addition to the compositions of this invention, other additives which are well known to those of skill in the art. These can include anti-knock agents such as tetraalkyl lead compounds, lead scavengers such as haloalkanes (e.g., ethylene dichloride and ethylene dibromide), deposit preventors or modifiers such as triaryl phosphates, dyes, cetane improvers, anti-oxidants such as 2,6-di-tertiary-butyl-4-methylphenol, rust inhibitors, such as alkylated succinic acids and anhydrides, bacteriostatic agents, gum inhibitors, metal deactivators, demulsifiers, upper cylinder lubricants, anti-icing agents and the like.

In certain preferred fuel compositions of the present invention, the afore-described compositions of this invention are combined with other ashless dispersants in gasoline. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645, British Pat. Nos. 981,850 and 1,055,337 and U.S. Pat. Nos. 3,255,108; 3,311,558; 3,331,776; 3,346,354; 3,522,179; 3,579,450; 3,542,680; 3,381,022; 3,639,242; 3,697,428; 3,708,522; and British Patent Specification 1,306,529. These patents are expressly incorporated herein by reference for their disclosure of suitable esters and methods for their preparation. Generally, the weight ratio of the compositions of this invention to the aforesaid ashless dispersants is about 0.1 to about 10.0; preferably about 1 to about 10 parts of composition of this invention to 1 part ashless dispersant.

In still another embodiment of this invention, the inventive additives are combined with Mannich condensation products formed from substituted phenols, aldheydes, polyamines, and amino pyridines. Such condensation products are described in U.S. Pat. Nos. 3,649,659; 3,558,743; 3,539,633; 3,704,308; and 3,725,277.

The compositions of this invention can be added directly to the fuel or lubricating oil to form the fuel and lubricant compositions of this invention or they can be diluted with a substantially inert, normally liquid organic solvent/diluent such as mineral oil, xylene, or a normally liquid fuel as described above, to form an additive concentrate which is then added to the fuel or lubricating oil in sufficient amounts to form the inventive fuel and lubricant composition described herein. These concentrates generally contain about 20 to about 90 percent of the composition of this invention and can contain in addition any of the above-described conventional additives, particularly the afore-described ashless dispersants in the aforesaid proportions. The remainder of the concentrate is the solvent/diluent.

Typical fuel and lubricating compositions of this invention are listed in Tables I and II, respectively. Except for the values for mineral oil and for the products of examples 2, 5, 7, 9 and 11, all amounts are exclusive of mineral oil used as diluent. In Table I, amounts are in parts by weight per million parts of gasoline.

TABLE I

| Ingredient | Parts by weight per million parts gasoline Fuel | |
|---|---|---|
| | A | B |
| Product of Example 5 | 98 | — |
| Product of Example 9 | — | 150 |
| Tretolite proprietary demulsifier composition | — | 2 |
| Exxon proprietary demulsifier composition | — | 4 |
| Nalco proprietary demulsifier composition | — | 2 |
| Xylene | — | 74 |
| Isooctyl alcohol | — | 49 |

TABLE II

| Ingredient | Parts by weight Lubricant | | |
|---|---|---|---|
| | C | D | E |
| Mineral Oil (SAE 10W-40 base) | 78.18 | — | 80.08 |
| Mineral oil (SAE 30 base) | — | 90.69 | — |
| Product of Example 2 | 4.44 | — | — |
| Product of Example 7 | — | 5.00 | — |
| Product of Example 11 | — | — | 2.00 |
| Polyisobutenyl succinic anhydride-polyethylene polyamine reaction product | — | — | 1.89 |
| Polyisobutenyl succinic anhydride-polyethylene polyamine-boric acid reaction product | 2.04 | — | — |
| Pentaerythritol ester of poly-isobutenyl succinic acid | — | — | 1.77 |
| Basic calcium petroleum sulfonate | — | 0.57 | — |
| Basic calcium salt of alkyl-phenol sulfide | — | 1.69 | — |
| Zinc tetrapropenylphenylphosphorodithioate | — | 2.05 | — |
| Tetrapropenylsuccinic acid | 0.34 | — | — |
| Reaction product of alkylphenol, formaldehyde and dimer-captothiadiazole | 0.49 | — | — |
| Sulfurized Diels-Alder adduct | 1.33 | — | 1.31 |
| 2,6-Di-t-butyl-p-cresol | 0.03 | — | 0.03 |
| Hindered phenol antioxidant | 0.32 | — | — |
| Ethylene-propylene-diene terpolymer | 12.49 | — | 12.57 |
| Vinyl carboxylate-vinyl ether-dialkyl fumarate terpolymer | 0.34 | — | 0.35 |
| Silicone anti-foam agent | 0.006 | 0.01 | 0.004 |

What is claimed is:

1. A composition made by the method comprising
   1. reacting at least one phenol compound containing at least one aliphatic or alicyclic substituent of at least about six carbon atoms with at least one aldehyde or precursor thereof in the presence of an alkaline reagent, at a temperature up to about 125° C.; then 2. substantially neutralizing the intermediate thus formed at a temperature up to about 150° C; and then 3. reacting the neutralized intermediate with at least one amino compound which contains one or more amino groups having hydrogen directly bonded to amino nitrogen.

2. The composition of claim 1 wherein the aldehyde is formaldehyde or a precursor thereof, the temperature of step (1) is about 50°–125° C., and the temperature of step (2) is about 50°–150° C.

3. The composition of claim 1 wherein the substituent on the phenol compound is an aliphatic substituent having at least about 30 carbon atoms.

4. The composition of claim 1 wherein the amino compound is alkylene polyamine.

5. The composition as claimed in claim 1 wherein the substituent on the phenol compound contains at least about 50 aliphatic carbon atoms.

6. The composition of claim 4 wherein the alkylene polyamine is ethylene polyamine.

7. The composition of claim 1 wherein the substituent on the phenol compound is derived from polymerized isobutene.

8. The composition of claim 1 wherein the amino compound is aromatic amine containing about six to about 30 carbon atoms.

9. The composition of claim 1 wherein the substituent on the phenol compound is a substantially saturated hydrocarbyl group having an average of about 30 to about 700 carbon atoms.

10. The composition of claim 9 wherein said substituent is derived from a homo- or interpolymer of a $C_{2-8}$ 1-mono- or diolefin.

11. The composition as claimed in claim 1 wherein the substituent on the phenol compound is derived from polypropylene or polybutene and has an average of about 50 to about 400 carbon atoms.

12. The composition of claim 1 wherein said intermediate has the formula

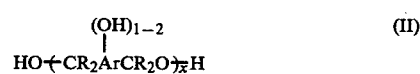

or mixtures of (I) and (II), wherein each R is independently hydrogen or a lower hydrocarbon based group; Ar is a benzene nucleus having at least one aliphatic, hydrocarbon-based substituent of at least 6 carbon atoms; and x is an integer of 1 to about 10.

13. The composition of claim 1 wherein said intermediate has the formula

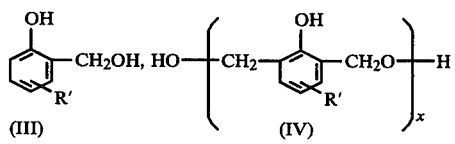

or mixtures of (III) and (IV), wherein R' is a substantially saturated aliphatic hydrocarbyl group of about 30 to about 700 carbon atoms.

14. The composition of claim 1 wherein the amino compound is a mono- or polyamine.

15. The composition of claim 1 wherein the amino compound is an alkylene polyamine of the formula

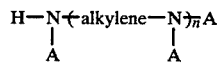

wherein n is an integer of 1 to about 10; A is a hydrocarbon-based substituent or hydrogen atom; and the radical "alkylene" is a lower alkylene radical of up to 7 carbon atoms.

* * * * *